(12) United States Patent
Stroman

(10) Patent No.: US 6,170,586 B1
(45) Date of Patent: Jan. 9, 2001

(54) ABSORBENT AND ATTACHABLE PAD FOR ABSORBING VEHICLE FLUID LEAKS

(76) Inventor: Randall N. Stroman, 2354 Dayton Crest Cir., South Jordan, UT (US) 84095-3433

(*) Notice: Under 35 U.S.C. 154(b), the term of this patent shall be extended for 0 days.

(21) Appl. No.: 09/209,975

(22) Filed: Dec. 11, 1998

(51) Int. Cl.$^7$ .................................................. F16N 31/00
(52) U.S. Cl. ........................................ 180/69.1; 184/106
(58) Field of Search .............................. 180/69.1; 184/106

(56) References Cited

U.S. PATENT DOCUMENTS

| | | | |
|---|---|---|---|
| 2,171,813 | * 9/1939 | Stockstrom | 180/69.1 |
| 2,732,024 | * 1/1956 | Schonwald | 180/69.1 |
| 2,783,848 | 3/1957 | Beskid . | |
| 3,316,995 | 5/1967 | Fay . | |
| 4,936,418 | 6/1990 | Clausen . | |
| 5,404,848 | 4/1995 | Nelson . | |
| 5,417,310 | 5/1995 | Halseth . | |
| 5,501,290 | 3/1996 | Volz et al. . | |
| 5,526,900 | 6/1996 | Mason . | |
| 5,711,402 | 1/1998 | Sumpter, Sr. . | |

* cited by examiner

Primary Examiner—Richard M. Camby
(74) Attorney, Agent, or Firm—Thorpe, North & Western, L.L.P.

(57) ABSTRACT

An apparatus for a flexible, attachable and absorbent pad for absorbing fluid leaks from an irregular surface on a motor vehicle. The pad includes an absorbent quilted pad which faces to receive the liquids or oils which drop from an engine part or structure. The pad is made from a heat resistant material which is absorbent enough to absorb a cup or two of fluid. An outer sheet is bonded to the bottom side of the absorbent pad so which is water resistant and able to retain accumulated oil or fluids which may pass through the absorbent pad. Each edge of the outer sheet is folded around the peripheral of the pad and heat sealed or glued to the pad. Tethers, such as wires, cords, or the like, are then disposed through the folded border sections and glued or sealed to the outer sheet and absorbent pad. The tethers are then used to fasten the pad to a fluid leak by connecting the tether together around the vehicle structure which is leaking and molding the pad to the irregular surface.

7 Claims, 3 Drawing Sheets

ABSORBENT AND ATTACHABLE PAD FOR ABSORBING VEHICLE FLUID LEAKS

BACKGROUND OF THE INVENTION

1. Field of the Invention

This invention relates generally to absorbent pads for fluid leaks, and more particularly to a flexible and absorbent pad used as a vehicle accessory and attached to the underside of a vehicle to catch oil or fluid leaks from the engine, transmission or other parts of a stationary or moving vehicle.

2. State of the Art

One problem with automobiles as they age is they begin to drip fluids, especially oil. The oil that leaks from vehicles stains driveways and garages. In addition, oil leaking from vehicles accumulates on roadways which makes the roads slick when it rains or snows. The oil which falls on roadways may then find its way into nearby dirt, streams and waterways which creates an environmental hazard.

Leaks are also found in industrial and commercial applications where a pipe, hose or engine may leak onto a floor or carpet. It would be desirable to have an absorbent pad which is inexpensive, easy to install, and could be used in all of the applications above with equal ease, to absorb and prevent the oil or fluid from dripping onto the ground or roadway.

Many devices have been disclosed in the prior art to catch oil and other fluids which drip primarily from automobiles. These devices are useful to an extent but they have certain disadvantages which are overcome by the current invention.

Several of the oil and drip absorbing devices in the prior art have rigid fluid collectors. Examples of these are U.S. Pat. No. 5,711,402 and U.S. Pat. No. 5,404,848 which both have a rigid pan configuration. Rigid pans do not conform well to the irregular surface of a leaking part. Gaps formed between a leaking surface under a vehicle and a rigid collection device may allow fluids collected to leak out and also allow water or debris to enter into the pan as the vehicle is traveling. If a pan fills with water or debris, it will not effectively collect dripping fluids. Rigid collection pans also hang down below the vehicle which can make them unsightly.

In a fluid collection device with a rigid pan, the pan must be parallel to the bottom of the automobile and deep enough to hold the liquids it catches. A rigid pan must stay relatively level or the liquid may spill out over the pan edges when the pan is not level. Examples of this are when a vehicle is on a hill, goes over bumps or hits potholes. This spilling problem is worse if water, snow or road debris help to fill the drip pan. The depth of a pan is a disadvantage because the pan hangs down below the normal clearance of the vehicle. Reduced clearance created by the drip pan may result in the pan being pulled off the vehicle when it is hit by rocks or a high curb.

Another method of collecting oil and fluid leaks uses absorbent material to collect dripping oil and fluids. Devices using absorbent material generally cover the whole vehicle undercarriage or motor bottom and they do not conform in shape to these parts.

SUMMARY AND OBJECTS OF THE INVENTION

It is an object of the invention is to provide a drip collection device which can be easily installed, molded and conformed to the leaking part of a motor vehicle.

It is another object of this invention to provide a device which is inexpensive and yet sturdy.

It is also an object of the invention is to provide a replacable fluid collection device which can be disposed of easily.

The above objects and others not specifically recited are realized in the present invention by provision of an absorbent and attachable pad for fluid leaks in vehicle engines and pipes. The attachable, absorbent pad of the present invention is comprised of a quilted absorbent pad for placement snugly against the underside parts of a vehicle to receive liquids or oil which leak from an engine, engine part or a hose. A plastic outer sheet is bonded to the bottom side of the absorbent pad and is water resistant and able to retain accumulated oil or fluids which may pass through the absorbent pad.

The preferred plastic sheet is sturdy enough so that it does not easily rip or shred, is not heat sensitive, and is flexible enough to be molded around the underside parts of a vehicle.

In accordance with one aspect of the invention, each edge of the plastic outer sheet is folded into border sections in an enclosing lip shape around the absorbent pad. The border sections are then beat sealed or glued to the absorbent pad. This seal holds the outer sheet in place with respect to the absorbent pad so it will not slip or move as the pad fills with liquid.

Wires or other manipulable elements are then disposed through selected opposing border sections and glued or sealed to the outer sheet and absorbent pad. These elements are used to fasten the pad to the each side of a dripping structure.

DETAILED DESCRIPTION

Figure 1:
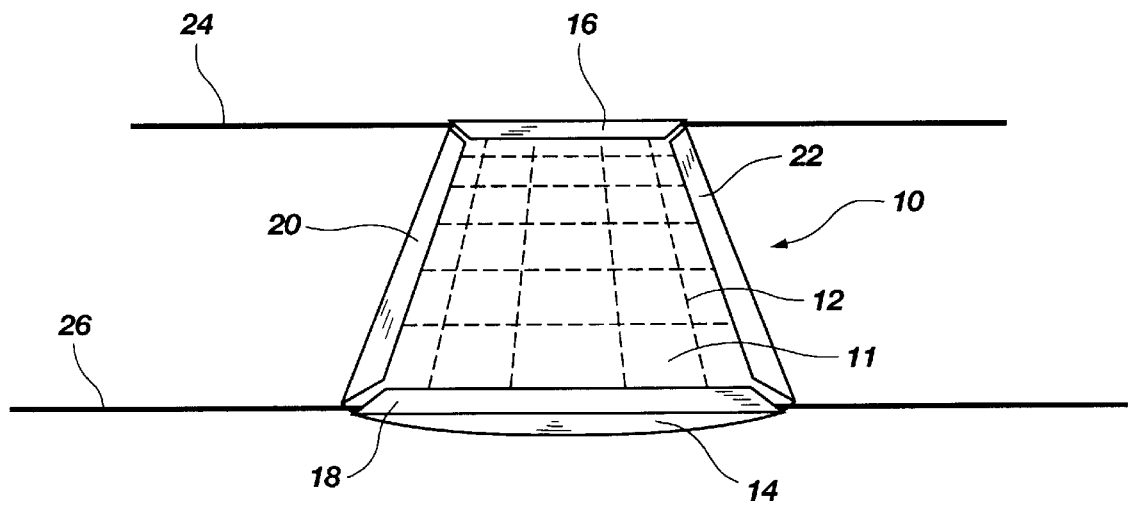
FIG. 1 is a perspective view of an attachable absorbent pad showing the quilted top side, and made in accordance with the principles of the present invention.

FIG. 1 illustrates the preferred embodiment of this invention. The absorbent pad 10 is shown in perspective view to include a generally rectangular pad 11 enclosed on its underside by a plastic outer sheet 14. The pad 11 may be quilted 12 in a square block type pattern which aids in retaining fluid by creating pockets so the fluid is more evenly distributed throughout the absorbent pad 11.

The pad 11 is made from any material which is absorbent enough to absorb at least one or two cups of fluid. Examples of materials from which the pad 11 can be made are absorbent paper based material, treated natural fibers, natural fabric, synthetic textiles and fibers, synthetic sponge or any porous absorbent material commonly used for absorbing oil spills. This absorbent material could be anywhere from ⅛ of an inch to several inches thick with the preferred thickness being ¾ of an inch thick. The thickness also depends on the material used. The preferred absorbent material should be heat resistant because it will be used near vehicle engines and exhaust systems which can become quite warm.

Although the pad 11 and its outer sheet could be many sizes, the preferred sizes are: a 10 inch by 10 inch absorbent pad for small leaks, a 6 inch by 18 inch pad for vehicle differentials or cross frames, and an 18 inch by 18 inch pad for drips from the transmission fluid pan, oil pan or other large areas.

A plastic outer sheet 14 is bonded to the bottom side of the pad 11. The outer sheet 14 is water resistant and is able to retain accumulated oil or fluids which may pass through the pad 11. The preferred plastic sheet 14 is a strong plastic which does not easily rip or shred and is not heat sensitive. One plastic that has these properties is a plastic by the trademark TYVEK which is manufactured by the Dupont corporation. TYVEK is plastic formed into tough sheets made of high-density polyethylene fibers. Very fine fibers of polyethylene are spun together and bonded with heat and pressure. Although TYVEK is the preferred plastic sheet in this invention, is should be recognized that other plastic sheets with similar strength, heat resistance, toughness and light weight properties could be used in the plastic outer sheet. Using a tough, durable outer sheet makes the invention less susceptible to damage by rocks or road debris when the absorbent pad 10 is attached to the motor vehicle. The preferred embodiment of this invention uses a tough outer sheet of plastic which resists shredding or water. The plastic sheet is very flexible so it can be molded around the leaking automobile part or pipe. Fluid leaks are contained more effectively when the absorbent pad is molded directly to the irregular surface of a motor vehicle.

Each edge of the plastic outer sheet 14 is folded into border sections 16–22 around the pad 11 and heat sealed or glued to the pad 11. This seal holds the pad 11 in place with respect to the outer sheet 14 so it does not slip or move as it fills with liquid. The pad 11 can also be sealed to the outer sheet in other places, if desired, to further bond the absorbent pad to the sheet.

The preferred embodiment uses one wire 24 slotted through the first border section 16 in a direction parallel to the pad's edge. The wire is then glued or sealed in place to the outer sheet 14 and pad 11. This fixes the wire in relation to the border 16 it is passing through. The wire is then used to fasten the pad 10 to the first side of a leak by pulling the wire ends together around the object which is leaking, and twisting the two opposite ends of the wire together with several twists. The material which forms the wires can be any suitable flexible metal or metal alloy. The metal or alloy does not necessarily need to be rust or weather resistant because the pad 11 is only a temporary drip retainer.

A second wire 26 is disposed through a second opposing border section in a direction parallel to the second opposing pad edge 18. The second wire 26 is also glued or sealed in place to the outer sheet 14 and the pad 11 to hold the wire in place. The second wire is wrapped around a second part of the structure near the leak and then twisted several times to hold the wire in place. The invention uses the wire connectors to form the pad 11 to the irregular motor vehicle surface. The prior art devices are not molded to a leaking surface because they are only attached below the leaking area. Using the wire connectors to connect the pad to an irregular vehicle surface is also an advantage over the prior art because wire connectors are difficult to use with a drip pan which may rock and tilt when attached.

Attachment methods other than wires may be used to connect the absorbent pad to the leaking parts of the vehicle. Cords connected with plastic clipping mechanisms or twine tied together or can be used to attach the pad to parts underneath the vehicle. If cords are used they should be fairly heat resistant. Another embodiment of the connectors are metal chains or thin cables which can be used with the pad. There are a number of ways one skilled in the art could attach the flexible and conformable pad as long as the pad can still be formed around the irregular surfaces of automobile parts.

Installing this invention is very straightforward. Since the wires 24 and 26 are attached to the outer sheet 14 and the pad 11, which are in turn bonded to each other, there is no setup involved to install the temporary fluid collection pad. This is an advantage because the prior art devices must be assembled before they are installed and places must be found to attach the springs or straps. This invention is already pre-assembled and ready to mount around the leaking part. Another useful feature of this invention is that the pad can be resized quickly by an installer if necessary. The pad 11 and the plastic outer cover 14 can be cut with a pair of scissors to adjust the pad and outer cover size to fit the dripping area more precisely.

Figure 2:
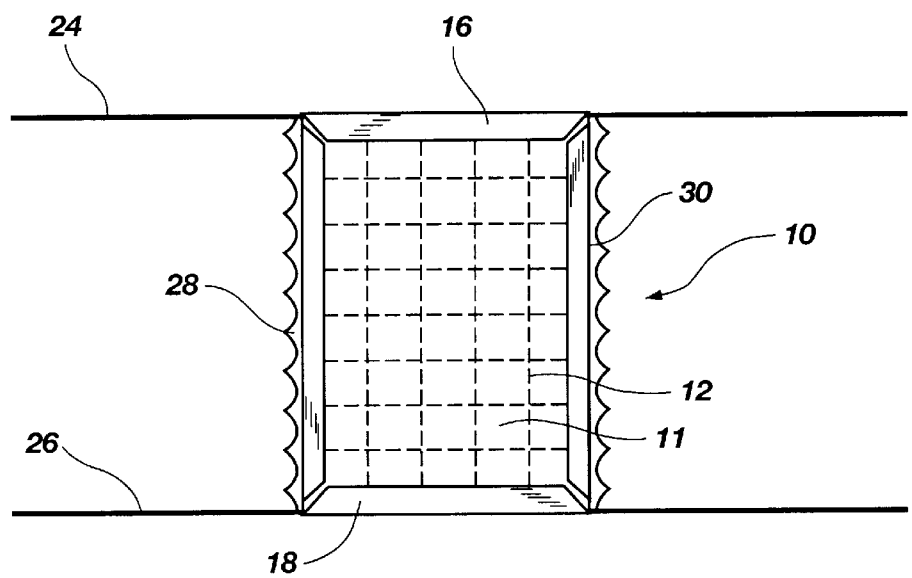
FIG. 2 shows a top view of an attachable absorbent pad with elastic edges.

Referring to FIG. 2, an attachable pad 10 for fluid leaks is shown with elastic material sewn into the two opposing edges 28 and 30 which do not have wires attached through them. The elasticated borders 28 and 30 are also folded over the pad 11 and glued or heat sealed to the pad 11. Elasticated borders allow the invention to better conform to a dripping area. This is an advantage over the prior art which does not conform to irregularly shaped dripping areas. The prior art only uses absorbent materials which are fastened below the leaking area in a flat manner using complicated attachment mechanisms such as springs or buckled straps. This invention conforms to a leaking area whether it is a transmission, a hose or similar structure, and better absorbs the dripping liquid in the pad 11. Because the invention uses elastics to conform the dripping area and it has a water resistant outer sheet, the invention keeps water or snow out of the absorbent area.

In an alternative embodiment of the invention, multiple wires can be attached at different points along the absorbent pad instead of using wires only at each pad edge. A pad may have wires or tethers attached along the invention at multiple points to hold the pad more securely to the dripping area.

Another embodiment of the invention is to attach the wires in multiple directions. When the wires are attached to each of the border flaps so the wires cross each other, they give additional support to the other wires and the absorbent pad is attached tightly to the leak. It must be mentioned that the wires can also be wrapped around separate vehicle structures as opposed to being twisted together around a single structure (e.g. each wire is twisted to a different pipe but the pad is still under the dripping area). The use of wires as attachment devices in the invention is advantageous because they do not sag or vibrate like springs. Springs may come loose or eventually lose their strength over time as the vehicle travels. Wires do not stretch out or become weaker when this invention is attached and the vehicle is driven. This invention generally has a lighter load because the material that forms the pad weighs only a few ounces, in contrast to a heavy drip pan.

Another embodiment of the present invention use different pad shapes. The pad can be configured in a variety of shapes such as a triangle, ellipse (football), L-shape, or other flat geometric shapes which will help it conform to a leaking vehicle part or structure.

Figure 3:
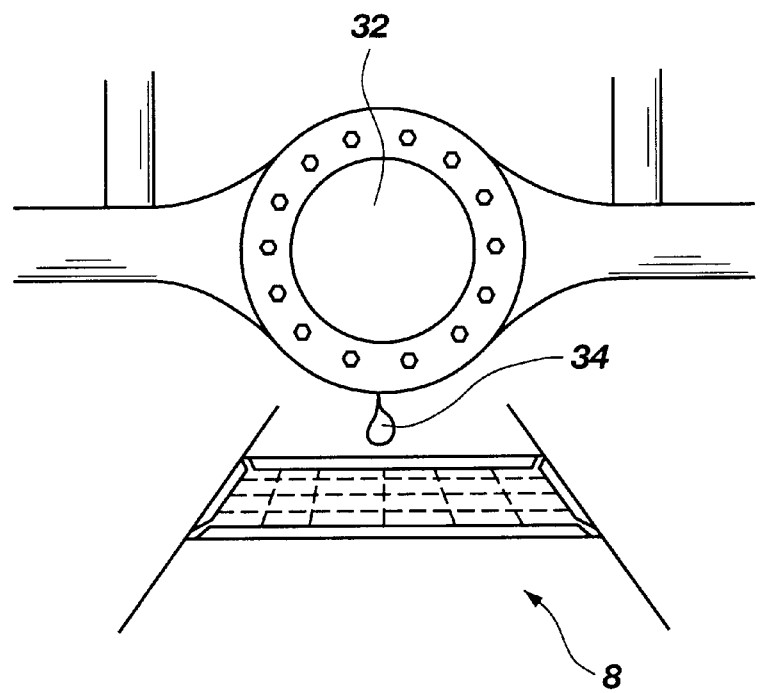
FIG. 3 shows a side perspective view of an attachable absorbent pad below a vehicle axle.
Figure 4:
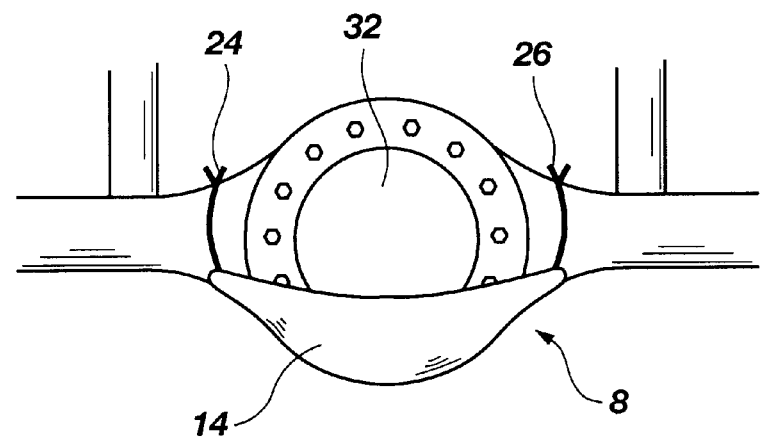
FIG. 4 shows a side perspective view of an attachable absorbent pad attached to the axle.

FIG. 3 is the attachable pad 8 underneath a vehicle axle 32 before it has been fastened to the axle 32. Oil or fluid 34 is shown leaking out of the axle 32. FIG. 4 shows the attachable pad 8 after it has been fastened to the axle 32 to absorb the oil leak. The wires 24 and 26 are wrapped around the axle 32 and the ends are twisted together to hold the attachable pad 8 in place. The outer sheet is also shown 14 as it forms a protective sheet for the absorbent pad 8. As you can see from the attachment configuration, this invention is much quieter than the prior art because there is no drip pan to clang against the automobile when bumps are encountered and there are no springs to bounce up and down.

Figure 5:
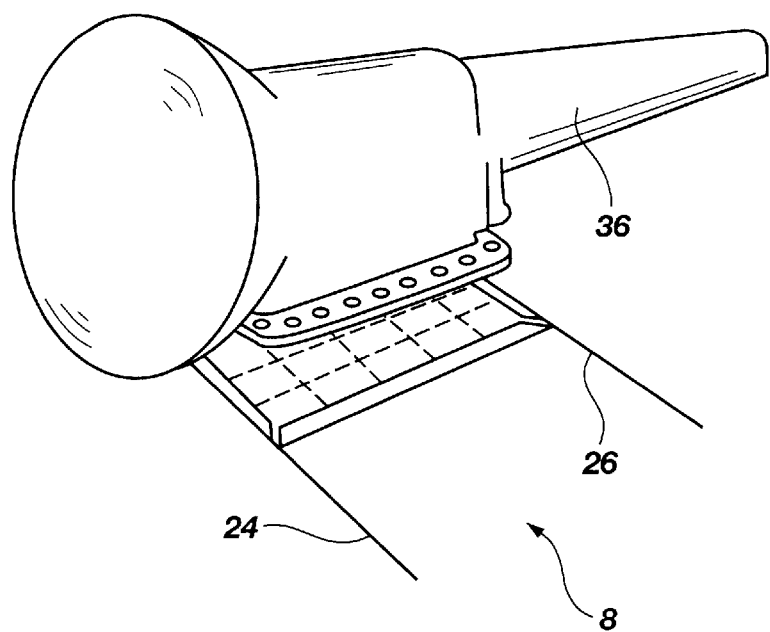
FIG. 5 is a perspective view of an absorbent pad below a vehicle transmission.
Figure 6:
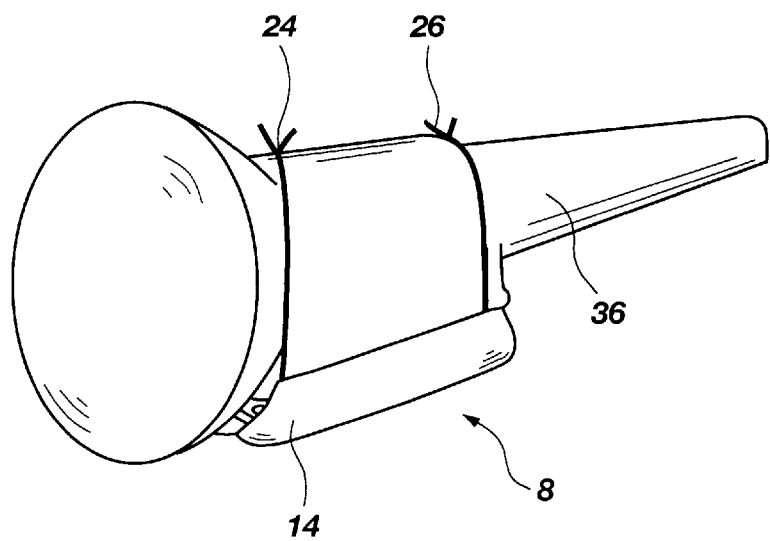
FIG. 6 is a perspective view of an absorbent pad attached to the vehicle transmission.

FIG. 5. shows the attachable pad 8 underneath a vehicle transmission 36 before it has been fastened to the transmission 36. FIG. 6 then shows the absorbent pad 8 attached to the axle with wires 24 and 26 including their ends twisted together over the transmission 36. When the pad 8 is attached it exposes the outer layer 14. It should be noted that the size of the pad 8 used for the transmission 36 will be much larger than one used for an axle 32 (e.g. transmission pads would be 18 by 18 inches). Pads 8 used for hoses or pipes would be smaller still (e.g. 10 by 10 inches). The length of the wires varies depending on the size of the object they will be wrapped around. Long wires may be wrapped around a small object several times to help to attach the pad 8 to the leaking structure. An example is a leaking pipe or hose where the wire could be wrapped around the item several times before the wire ends are twisted together to effectively attach the pad 8.

The current invention is designed to be temporary and disposable, so the removal of the pad 8 is simple too. After the pad 8 has been attached to the dripping area and has filled with fluid, the attachment wires 24 and 26 can be cut or untwisted to remove the pad. Then because the pad 8 is very flexible, it rolls up and the wires 24 and 26 can be wound around the roll. This way the pad is disposed of without an oily mess and the oil is trapped by the absorbent material and the plastic outer sheet. In addition, the pad 8 is made from materials which are inexpensive so that it can be disposed of when the fluid leak is repaired or a new pad is put on in its place. This pad 8 has the extra advantage it is inexpensive to manufacture because it only has a few parts.

It will be appreciated that other embodiments of the present invention may be employed in many applications to accomplish an attachable pad for absorbing vehicle fluid leaks. While certain preferred embodiments have been explained above, the appropriate scope hereof is deemed to be in accordance with the claims as set forth below.

What is claimed is:

1. An attachable fluid absorbent pad for attachment under a motor vehicle having an irregular surface and parts about which tethers may be wrapped, for receiving dripping fluids from the motor vehicle, comprising:
    (a) a flexible absorbent pad having a top and bottom side, first and second opposite edges, and third and fourth opposite edges, wherein the pad is heat resistant, quilted and sized so it can be molded to cover a fluid leak in a motor vehicle;
    (b) a plastic outer sheet bonded to the bottom side of the absorbent pad, wherein the outer sheet is water and oil resistant;
    (c) first, second, third and fourth folded peripheral edges wherein each border is formed from the plastic sheet and folded around each of the four absorbent pad's edges and bonded to the absorbent pad;
    (d) a first wire disposed through the first folded edge to fasten the pad to a first side of a leak;
    (e) a second wire disposed through the second opposing folded edge to fasten the pad to a second side of a leak; and
    (f) at least one elastic member disposed in at least one folded edge, to mold the absorbent pad and the outer sheet to the irregular surface of the motor vehicle which is dripping.

2. An absorbent and attachable pad of claim 1, wherein the plastic outer sheet is further comprised of spun, woven, high-density polyethylene fibers which are bonded together with heat and pressure.

3. An absorbent and attachable pad of claim 2, wherein the absorbent pad is composed of material selected from the group consisting of paper material, natural fabric, and synthetic fabric, which can absorb oil and other fluids.

4. An attachable fluid absorbent pad for attachment under a motor vehicle having an irregular surface and individual parts about which tethers and the like may be wrapped, for receiving dripping fluids from the motor vehicle, the pad comprising:
    (a) a flexible, conformable absorbent pad for absorbing fluids from a motor vehicle and for placement under the motor vehicle and against an individual part to conform to the shape thereof; and
    (b) a moldable plastic outer sheet bonded to the bottom side of the absorbent pad wherein the plastic outer sheet is moldable against an individual part, wherein the plastic outer sheet is water and oil resistant;
    (c) a plurality of elongate attachment means for attaching the absorbent pad and sheet to parts of the motor vehicle to hold the pad against an individual part to receive and absorb fluids dripping or flowing thereon, wherein the attachment means are attached at one end to the perimeter of the pad at respective spaced apart locations.

5. An absorbent and attachable pad of claim 4, wherein the absorbent pad is selected from the group consisting of paper, natural fabric, and synthetic fabric to absorb a few cups of oil.

6. An absorbent and attachable pad as in claim 4, wherein the elongate attachment means comprise flexible non-resilient wires.

7. An absorbent and attachable fluid absorbent pad as in claim 4, wherein the elongate attachment means comprise:
    flexible, non-resilient cords wherein each cord has a free end; and
    attachment elements disposed on the free ends of the cords to connect the cord ends around an irregular surface on the motor vehicle and attach the pad to the surface.

* * * * *